United States Patent
Newman et al.

(10) Patent No.: US 7,129,958 B2
(45) Date of Patent: Oct. 31, 2006

(54) COLOR MANAGEMENT WITH TIERED CACHING SCHEME

(75) Inventors: Todd D. Newman, Palo Alto, CA (US); John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/650,548

(22) Filed: Aug. 28, 2003

(65) Prior Publication Data

US 2005/0046640 A1 Mar. 3, 2005

(51) Int. Cl.
G09G 5/02 (2006.01)
(52) U.S. Cl. .......................... 345/604; 358/1.9
(58) Field of Classification Search ................ 345/600, 345/601, 602, 603, 604; 358/1.9, 518; 382/162, 382/167, 274
See application file for complete search history.

(56) References Cited

U.S. PATENT DOCUMENTS

| | | | | |
|---|---|---|---|---|
| 5,432,906 | A | 7/1995 | Newman et al. | 345/501 |
| 6,362,808 | B1 * | 3/2002 | Edge et al. | 345/601 |
| 6,603,483 | B1 | 8/2003 | Newman | 345/593 |
| 2003/0020727 | A1 * | 1/2003 | Newman | 345/604 |
| 2003/0053094 | A1 * | 3/2003 | Ohga et al. | 358/1.9 |
| 2003/0053682 | A1 | 3/2003 | Haikin et al. | 382/162 |
| 2003/0193688 | A1 * | 10/2003 | Namikata | 358/1.9 |
| 2003/0234943 | A1 * | 12/2003 | Van Bael | 358/518 |

OTHER PUBLICATIONS

U.S. Appl. No. 09/360,449, filed Jul. 26, 1999 (Haikin et al.), now allowed.

U.S. Appl. No. 09/443,796, filed Nov. 19, 1999 (Newman et al.), pending.

U.S. Appl. No. 09/540,012, filed Mar. 31, 2000 (Haikin et al.), pending.

U.S. Appl. No. 10/274,895, filed Oct. 22, 2002 (Wang et al.), pending.

Knuth, D., *The Art of Computer Programming*, vol. III (1998).

Knuth, D., *The Art of Computer Programming*, vol. III, pp. 513-558 (1998).

* cited by examiner

Primary Examiner—Matthew Luu
(74) Attorney, Agent, or Firm—Fitzpatrick, Cella, Harper & Scinto

(57) ABSTRACT

Performing color management of color image data using a device transform by generating an identifier key based on contents of a color measurement profile for a color device, the color measurement profile containing measurement data corresponding to the color device, determining if a device transform corresponding to the identifier key is present in a device transform cache disposed in a persistent memory, loading, in the case that it is determined that a device transform corresponding to the identifier key is present in the device transform cache, the device transform into a program-accessible transient memory, generating, in the case that it is determined that a device transform corresponding to the identifier key is not present in the device transform cache, a device transform based on the measurement data in the color measurement profile, and storing the generated device transform in the device transform cache in correspondence with the identifier key, and transforming the color image data based on the device transform loaded in the program-accessible transient memory.

17 Claims, 11 Drawing Sheets

COLOR MANAGEMENT WITH TIERED CACHING SCHEME

BACKGROUND OF THE INVENTION

1. Field of the Invention

The present invention relates to color management of color image data using measurement data of color devices, and using a tiered caching system to reduce redundant calculations of device transform steps and gamut mapping steps. The present invention stores device transforms and entire transformation sequences in a cache after they are first calculated based on measurement data in their corresponding color management profiles. Each stored device transform and transformation sequence is indexed by a unique hash code which can then be used to retrieve the device transform or transformation sequence, as the case may be, during a subsequent color management process, thereby saving unnecessary computations to re-generate the needed device transform or transformation sequence.

2. Description of the Related Art

Known color management systems typically rely on the use of device profiles which describe the color characteristics of a source device which generated color image data, and of a destination device to which the color image data will be sent for reproduction. Color management systems use the device profiles to transform the color image data from the source device color space into the destination device color space, and to map the colors of the color image data from the gamut of the source device into the gamut of the destination device.

Device profiles are usually defined by a common standard, such as the ICC device profile format. The ICC, has generally standardized upon a profile that contains data that has been processed into an optimized format. The optimization process involves an appearance modeling step, a gamut mapping step, and a second appearance modeling step. The results of all those steps are then processed back into data structures such as matrices and multi-dimensional lookup tables which are placed into the device profile. These data structures were designed in the past so that they could be efficiently processed on computer hardware in existence at that time.

Unfortunately, the appearance modeling process described above to generate the data structures in the device profile result in predetermined matrices and/or look-up tables which combine color space transform steps (device modeling) and gamut mapping together, and which often do not provide a current depiction of the devices color characteristics. In this regard, one possible solution is for device profiles to contain color measurement data corresponding to the color device, so that a color device manufacturer, color management developer, or user could easily read, verify, and even modify the color measurement data to reflect the current device color characteristics or to reflect a unique approach to color management.

The ICC profile format currently supports a tag containing measurement data. However the tag is optional, not mandatory, and so the measurement tag data cannot be depended upon to be available for color management. In addition, changes to the measurement tag data have no effect on the other predetermined tags in the profile, such as the aforementioned matrices and/or look-up tables, and therefore the changes have no effect during color management of color image data when using the profile.

Even if the measurement data were present at the time of performing color management, the measured data would have to be processed to produce the data structures, such as matrices and lookup tables, that the system needs for mapping between device coordinate space and a color appearance space. Then the processed device models would be used to create a data structure, such as a gamut boundary descriptor, that describes the boundaries of the device's gamut. The gamut boundary descriptors, in turn, would be used with a gamut mapping algorithm to create a precise gamut mapping from the source device's gamut into the destination device's gamut. The complete transform from input device space, through a gamut mapping operation and into the destination device's space would therefore be created at runtime of the color management process. Such an approach would provide flexibility, because the transformation sequence would be based on the device measurement data and on user-specified gamut mapping algorithms, instead of stale, predetermined data structures. However, the foregoing process would require significant computing resources and time whenever color image data is rendered.

The ICC format also supports a special device link profile that appears to represent a predetermined transformation sequence. The device link profile represents the results that would be obtained by processing data through an arbitrarily long predetermined sequence of device modeling and gamut mapping steps. Users of such a device link profile have no real visibility of what the steps are, and have no ability to modify, or add to, the sequence of steps. Furthermore, the users must be able to recognize a particular predetermined sequence of transform steps and identify whether a specific device link profile is available that implements the sequence.

As stated above, the ICC profile scheme is not very flexible, and requires that the device profile be rebuilt whenever a user updates the measurements for a device. Even if the user only wants the gamut mapping algorithms supplied by a single profiling tool, this is not very convenient. But if the user wants other gamut mapping algorithms, the user will have to build more profiles using different tools. In addition, all of the predetermined device link profiles derived from the changed device profile will need to be recreated as well. The above problems result in significant additional work on the part of the user of the device profiles, such as a color profile or color management developer.

Accordingly, it is desirable to find one or more solutions to the foregoing problems. Among other solutions, it is desirable to invent a color management scheme which uses current measurement data of the involved color devices, and which can reduce the significant computational overhead associated with creating device transform (modeling) and gamut mapping steps from measurement data every time color image data is rendered by the color management scheme.

SUMMARY OF THE INVENTION

The present invention addresses the foregoing problems by providing a method for color management which uses current measurement data of the involved color devices, and which reduces the significant computational overhead associated with creating device transform (modeling) and gamut mapping steps from measurement data every time color image data is rendered by the color management scheme. In particular, the present invention caches device transforms and entire transformation sequences after they are first calculated from measurement data in the associated color management profiles. Each stored device transform and transformation sequence is indexed by a unique hash code which is then used to retrieve the device transform or transformation sequence, as the case may be, during a subsequent application of the color management process, thereby saving the unnecessary computational overhead required to re-create the needed device transform or transformation sequence.

In one aspect, the invention is directed to performing color management of color image data using a device transform by generating an identifier key based on contents of a color measurement profile for a color device, the color measurement profile containing measurement data corresponding to the color device, determining if a device transform corresponding to the identifier key is present in a device transform cache disposed in a persistent memory, loading, in the case that it is determined that a device transform corresponding to the identifier key is present in the device transform cache, the device transform into a program-accessible transient memory, generating, in the case that it is determined that a device transform corresponding to the identifier key is not present in the device transform cache, a device transform based on the measurement data in the color measurement profile, and storing the generated device transform in the device transform cache in correspondence with the identifier key, and transforming the color image data based on the device transform loaded in the program-accessible transient memory.

Preferably, the device hash code is obtained by hashing a set of data fields in the color measurement profile. In addition, the persistent memory is preferably the hard drive of the computing device performing the color management, and the program-accessible transient memory is preferably the random access memory of the computing device. The device transform cache is preferably a database of device transforms, each of which are indexed in accordance with a unique device hash code corresponding to the color measurement profile used to generated the device transform.

In this manner, the present invention provides the ability to perform color management on color image data using current measurement data of the involved color devices, while reducing the significant computational overhead associated with creating device transform and gamut mapping steps from measurement data every time color image data is rendered. In addition, the present invention allows a user to control the measurement data which depicts the color characteristics of the associated devices, and to select the gamut mapping algorithms used during the color management transformation sequence performed on color image data.

According to another aspect of the invention, color management of color image data is performed using a transformation sequence, by arranging a plurality of identifier keys into an identifier sequence, each identifier key corresponding to one of a device transform and a gamut mapping step, determining if a transformation sequence corresponding to the identifier sequence is present in a transformation sequence cache disposed in a memory, loading, in the case that it is determined that a transformation sequence corresponding to the identifier sequence is present in a transformation sequence cache, the transformation sequence into a memory, generating, in the case that it is determined that a transformation sequence corresponding to the identifier sequence is not present in the transformation sequence cache, a transformation sequence based on a device transform or a gamut mapping step corresponding to each identifier key in the identifier sequence, storing the generated transformation sequence in the transformation sequence cache in correspondence with the identifier sequence and loading the generated transformation sequence into the memory, and then transforming the color image data based on the transformation sequence loaded in the memory.

Preferably, the device transforms and gamut mapping steps are arranged in the transformation sequence in the same order as their corresponding identifier keys in the identifier sequence. Also, each identifier key corresponding to a device transform is preferably a device hash code which is created by applying a hashing algorithm to a color measurement profile for a color device. Each device transform is preferably obtained by determining if a device transform corresponding to the device hash code is present in a device transform cache disposed in the persistent memory and, if not, generating a device transform based on the measurement data in the color measurement profile, and storing the generated device transform in the device transform cache in correspondence with the device hash code. All obtained device transforms and gamut mapping steps are preferably used to create a multidimensional transform look-up table which is included in the transformation sequence and stored in the transformation sequence cache. Finally, the transformation sequence cache is preferably a database in which each stored transformation sequence is indexed in accordance with a unique identifier sequence, which is then used for subsequent retrieval.

In this manner, the present invention provides the ability to perform color management on color image data using current measurement data of the involved color devices, while reducing the significant computational overhead associated with creating an entire transformation sequence of device transform and gamut mapping steps from measurement data every time color image data is rendered. In addition, the present invention allows a user to control the measurement data which depicts the color characteristics of the associated devices, and to select the gamut mapping algorithms used in a color management transformation sequence which is performed on color image data.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention provides a color management scheme which uses current measurement data of the involved color devices, and which reduces the significant computational overhead associated with creating device transform (modeling) and gamut mapping steps from measurement data every time color image data is rendered, by caching device transforms and entire transformation sequences after they are first calculated from measurement data obtained from associated color management profiles.

Figure 1:
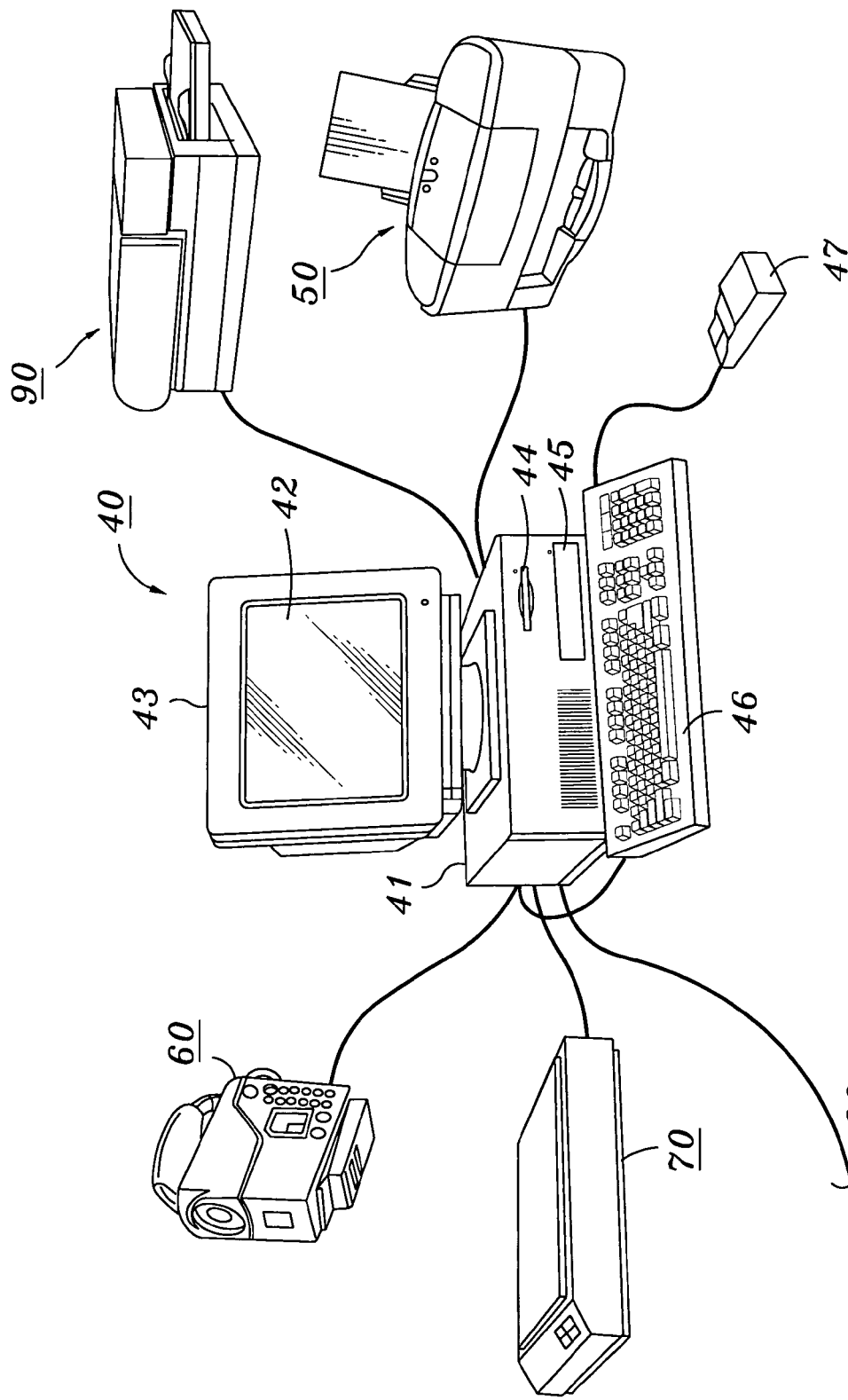
FIG. 1 is a representative view of a computing environment in which the present invention may be implemented according to one embodiment of the invention.

FIG. 1 depicts a computing environment in which the present invention may be implemented. FIG. 1 depicts a representative computing system including computing equipment, peripherals and digital devices which may be used in connection with the practicing the present invention. Computing equipment 40 includes host processor 41 which comprises a personal computer (hereinafter "PC"), preferably an IBM PC-compatible computer having a windowing environment such as Microsoft Windows 98, Windows 2000, Windows Me, Windows XP, or Windows NT, or other windowing system such as LINUX. In the alternative, host processor 41 may be an Apple computer or other non-windows based computer. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Computing equipment 40 also includes computer-readable memory media such as computer fixed disk 45 and floppy disk drive 44. Floppy disk drive 44 provides a means whereby computing equipment 40 can access information, such as image data, computer-executable process steps, application programs, etc. stored on removable memory media. In the alternative, information can also be retrieved through other means such as a USB storage device connected to a USB port (not shown), or through network interface 80. Also, a CD-ROM drive and/or a DVD drive (not shown) may be included so that computing equipment 40 can access information stored on removable CD-ROM and DVD media.

Printer 50 is a first printer, preferably a color bubble jet printer, which forms color images on a recording medium such as paper or transparencies or the like. Printer 90 is a second printer, preferably a color laser printer, which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other printers that use such colorant combinations, so long as the printer is capable of being interfaced to computing equipment 40. In addition, digital color scanner 70 is provided for scanning documents and images and sending the corresponding image data to computing equipment 40. Digital color camera 60 is provided for sending digital image data to computing equipment 40. Of course, computing equipment 40 may acquire digital image data from other sources such as a digital video camera, a local area network or the Internet via network interface 80.

Figure 2:
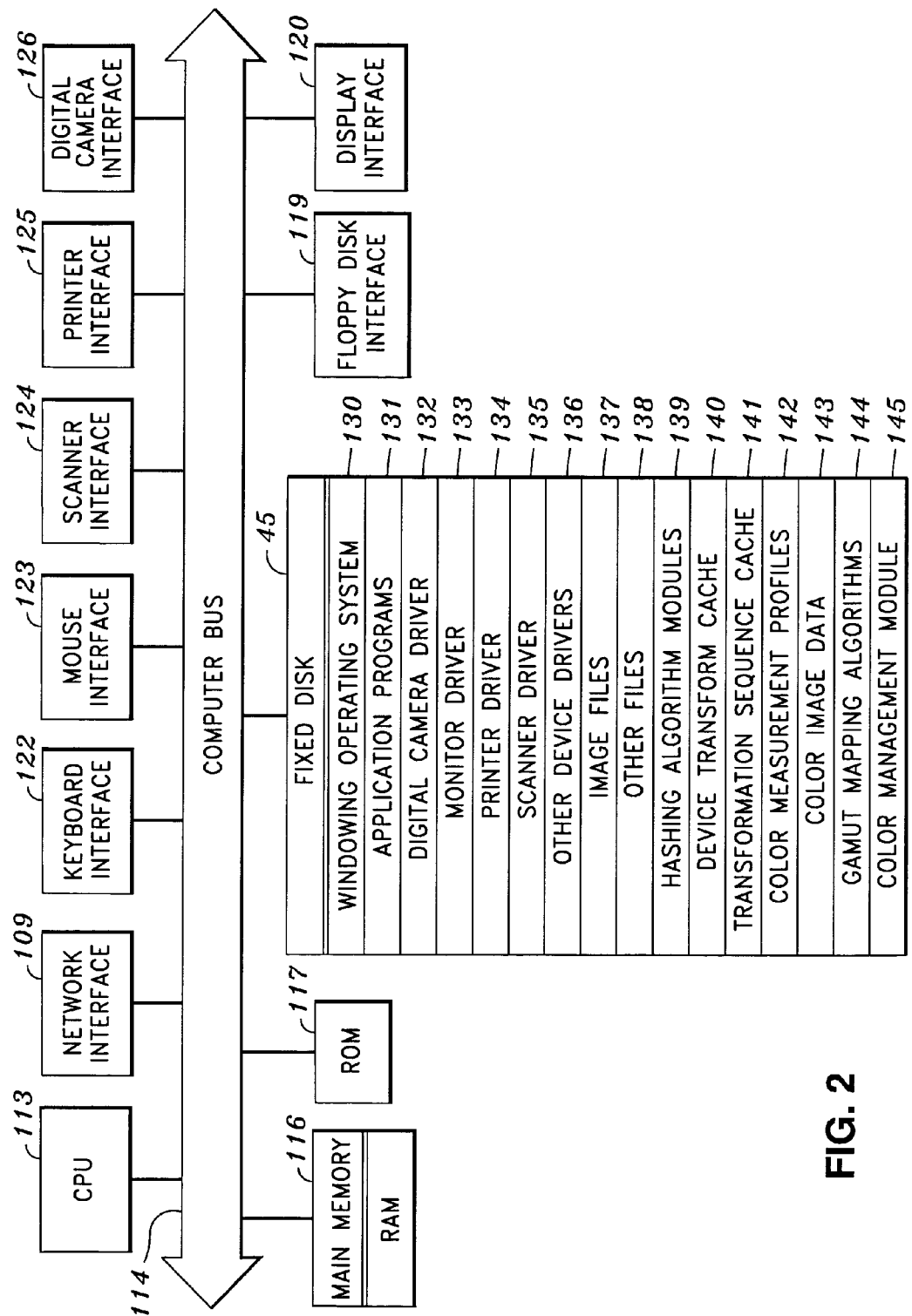
FIG. 2 is a detailed block diagram depicting the internal architecture of the computing device shown in FIG. 1 according to one embodiment of the invention.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, such as color management module 142, and device drivers. More specifically, CPU 113 first loads computer-executable process steps from fixed disk 45, or another storage device into a region of RAM 116. CPU 113 can then execute the stored process steps from program-accessible RAM 116 in order to execute the loaded computer-executable process steps. Data such representing color images or other information can be stored in RAM 116, so that the data can be accessed by CPU 113 during the execution of computer-executable process steps need to access and/or modify the data.

Fixed disk 45 is a persistent memory which contains operating system 130, which is preferably a windowing operating system although other operating systems may be used, application programs 131, such as a word processing program or a graphic image management program. Fixed disk 45 also contains digital camera driver 132, monitor driver 133, printer driver 134, scanner driver 135, other device drivers 136, image files 137 and other files 138. Fixed disk 45 also includes program modules and data files used to implement the present invention, which include hashing algorithm modules 139, device transform cache 140, transformation sequence cache 141, color measurement profiles 142, color image data 143, gamut mapping algorithms 144, and color management module 145. The functionality and use of the preceding foregoing program modules and data files in the implementation of the present invention are discussed in more detail below.

Figure 3:
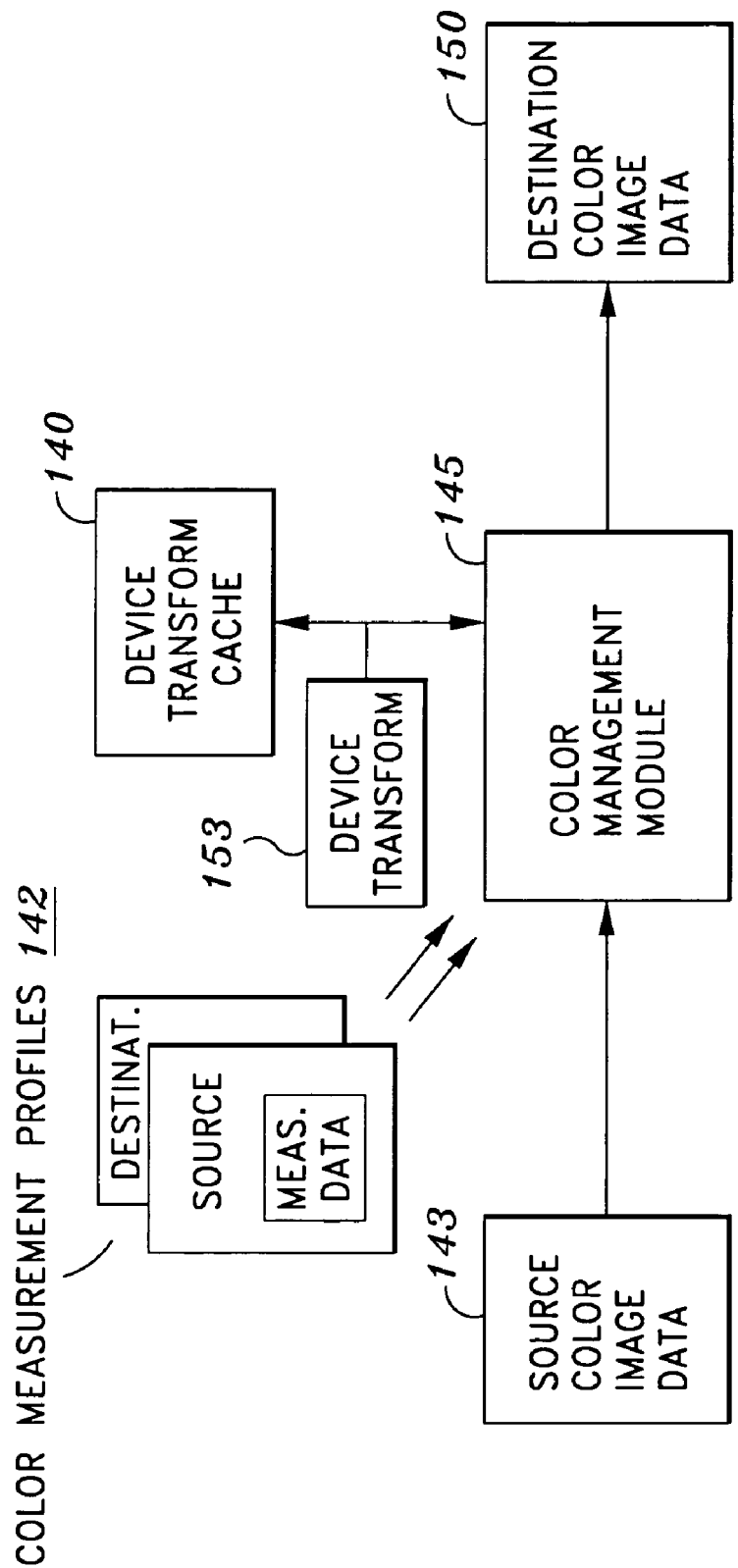
FIG. 3 is a diagram which depicts a color management process using a caching technique according to one embodiment of the invention.

FIG. 3 depicts a color management scheme according to a first embodiment of the invention in which device transforms are cached in order to save computational resources from wasteful and redundant process steps every time image data is rendered. As seen in FIG. 3, color management module 145 renders color image data 143 from a source color space and gamut into destination color image data 150 which is in a destination color space and gamut. In this manner, color image data from a source device, such as camera 60 can be appropriately rendered by printer 50 on an output medium. Color management module 145 depicted in FIG. 3 uses measurement data from color measurement profiles 142 to generate the device transforms and gamut mapping steps necessary to transform color image data 143 into the color space and gamut of destination color image data 150. The measurement data reflects measured color characteristics of the color measurement profile. Specifically, it contains plural pairs of device control values and calorimetric or spectral measurements associated with said device control values.

This scheme allows a user or developer to develop, modify or control color management module 145 in order to achieve a desired rendering intent. Color management module 145 caches each generated device transform 153 when it is initially generated in device transform cache 140. When a particular device transform is needed in a subsequent mapping of color image data by color management module 145, device transform cache 140 is checked to see if the same device transform has already been generated and cached. If so the device transform is retrieved and used by color management module 145 to map color image data 143 into destination color image data 150. In this manner, the color management scheme of the present invention uses caching of device transforms in a persistent memory to reduce the computational overhead required during color management of image data.

Figure 4:
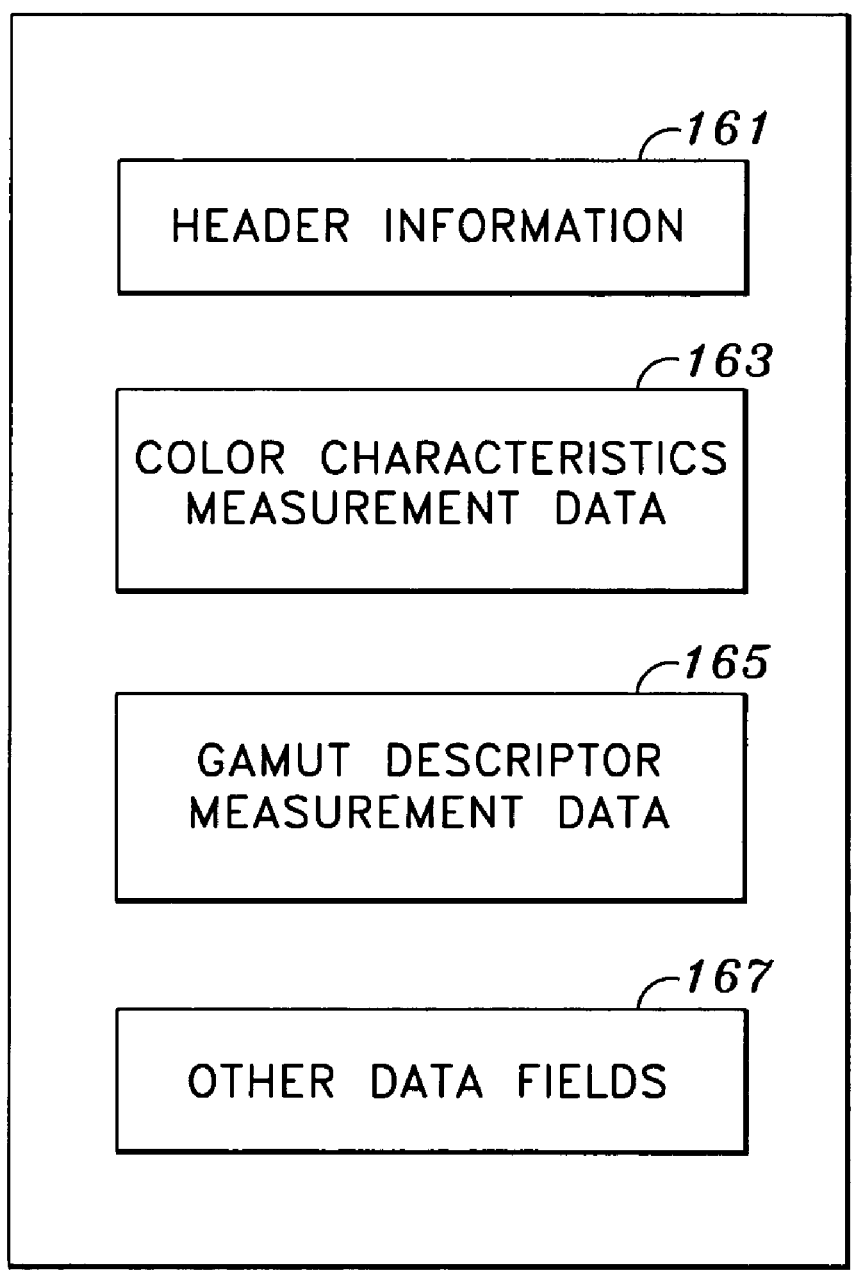
FIG. 4 is a diagram which depicts a color measurement profile according to one embodiment of the invention.

FIG. 4 depicts the contents of one of color measurement profiles 142 for use by color management module 145. As seen in FIG. 4, color measurement profile 160 includes header information 161, color characteristics measurement data 163, and data fields 167. Color measurement profile 160 corresponds to a specific device such as printer 50, and therefore the data in the aforementioned data fields represents the color characteristics. Header information 161 contains data representing identification information of the color device corresponding to color measurement profile 160, such as the model and manufacturer of the device, as well as the author and creation date for color measurement profile 160. Color characteristics measurement data 163 contains measurement data which represents the color behavior of the device, and can include other measured data such as color points which represent the range of neutral grays of the device. The measurement data can be obtained by objectively measuring a color target of color samples which were generated by the device. The color target is preferably generated in accordance with a predetermined color standard. Of course, other methods of obtaining the measurement data can be used, such as through the use of a complex mathematical device color model. Color characteristics measurement data 163 is accessed and used by color management module 145 to generate device transforms for use in mapping color image data to or from the device corresponding to color measurement profile 160. Other data fields 167 represents any other fields which a developer may want to include in color measurement profile 160.

Figure 5:
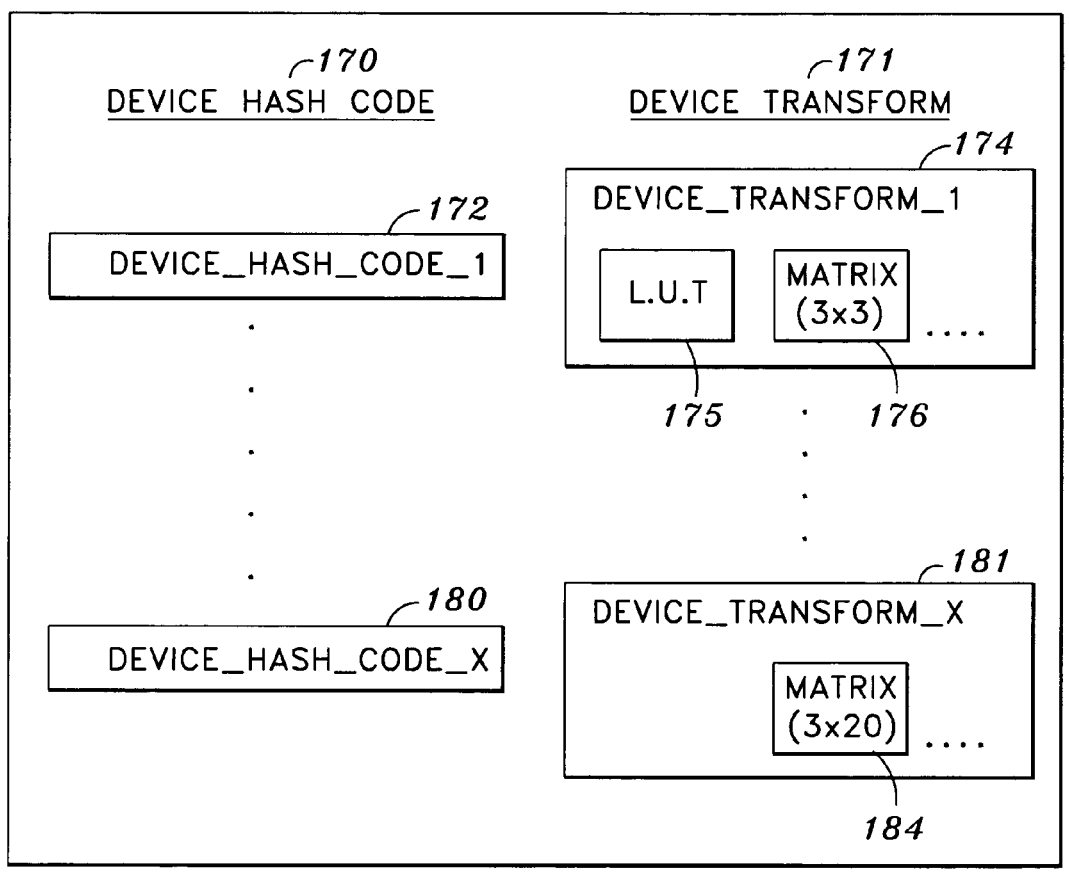
FIG. 5 is a diagram which depicts a device transform cache according to one embodiment of the invention.

FIG. 5 depicts the structure of device transform cache 140 which implements functionality of the invention. Preferably, device transform cache 140 is in the form of a database for ease of access and management, although other storage formats can be used without departing from the functionality and spirit of the invention. As seen in FIG. 5, device transform cache 140 is arranged in two columns of data fields, including "device hash code" column 170 and "device transform column" 171. Each row of device transform cache 140 includes a specific device hash code under "device hash code" column 170 and a corresponding device transform under "device transform column" 171. As mentioned above, color management module 145 stores each generated device transform in device transform cache 140 for future use to avoid repetitive and wasteful computations. Accordingly, each cached device transform is stored in correspondence to a unique device hash code so that color management module 145 can conveniently find a device transform corresponding to a particular color device involved in the mapping of color image data. For example, device_hash_code_1 172 is in the row corresponding to device_transform_1 174 in device transform cache 140, and device_hash_code_x 180 is in the row corresponding to device_transform_x 181.

In this regard, each device hash code under "device hash code" column 170 is generated by applying one of hashing algorithm modules 139 to color measurement profile 160 to obtain a unique device hash code. Hashing algorithm modules 139 represent a plurality of different hashing algorithms, which may include known hashing algorithms, such as an MD5 or a SHA-1 hashing algorithm, or specifically developed hashing algorithms. The selected one of hashing algorithm modules 139 can be applied to one or more of data fields of each color measurement profile, so long as the set of data fields hashed to created each device hash code is consistent. In a subsequent color mapping, color management module 145 first performs the same hash on the same set of fields for each involved color measurement profiles to determine the device hash code for each color measurement profile, and then searches device transform cache 140 to determine if the same device hash code is present under "device hash code" column 170. If so, the device transform under "device transform" column 171 which corresponds to the same device hash code is retrieved for use by color management module 145.

As also seen in FIG. 5, each cached device transform contains some form of data structure, such as a multi-dimensional matrix, a look-up table or both, for performing a color transform between the corresponding color device and a device-independent color appearance space. For example, device_transform_1 174 includes look-up table (L.U.T.) 175 and 3×3 matrix 176, and can include other data structures as well for representing a transform between the color space of the corresponding color device and a device-independent color appearance space. Look-up table (L.U.T.) 175 and matrix 176 are initially generated by color management module 145 based on at least color characteristics measurement data 163 of the color measurement profile for the corresponding color device. One or both of look-up table (L.U.T.) 175 and matrix 176 of thee device transform are then used by color management module 145 to map color image data to or from the color space of the corresponding color device. Look-up table (L.U.T.) 175 may be a multi-dimensional look-up table for color space conversion, and matrix 176 may be similarly represent an indexed method of color space conversion. Other known formats and structures may also be used for each cached device transform without departing from the functionality and spirit of the invention. Furthermore, it is not required that all cached device transforms be of the same format; each device transform should contain the structures, formats and data which are appropriate to characterize the corresponding color device. For example, device_transform_x 181 includes only 3×20 matrix 184 for representing a transform between the color space of the corresponding color device and a device-independent color appearance space.

Figure 6:
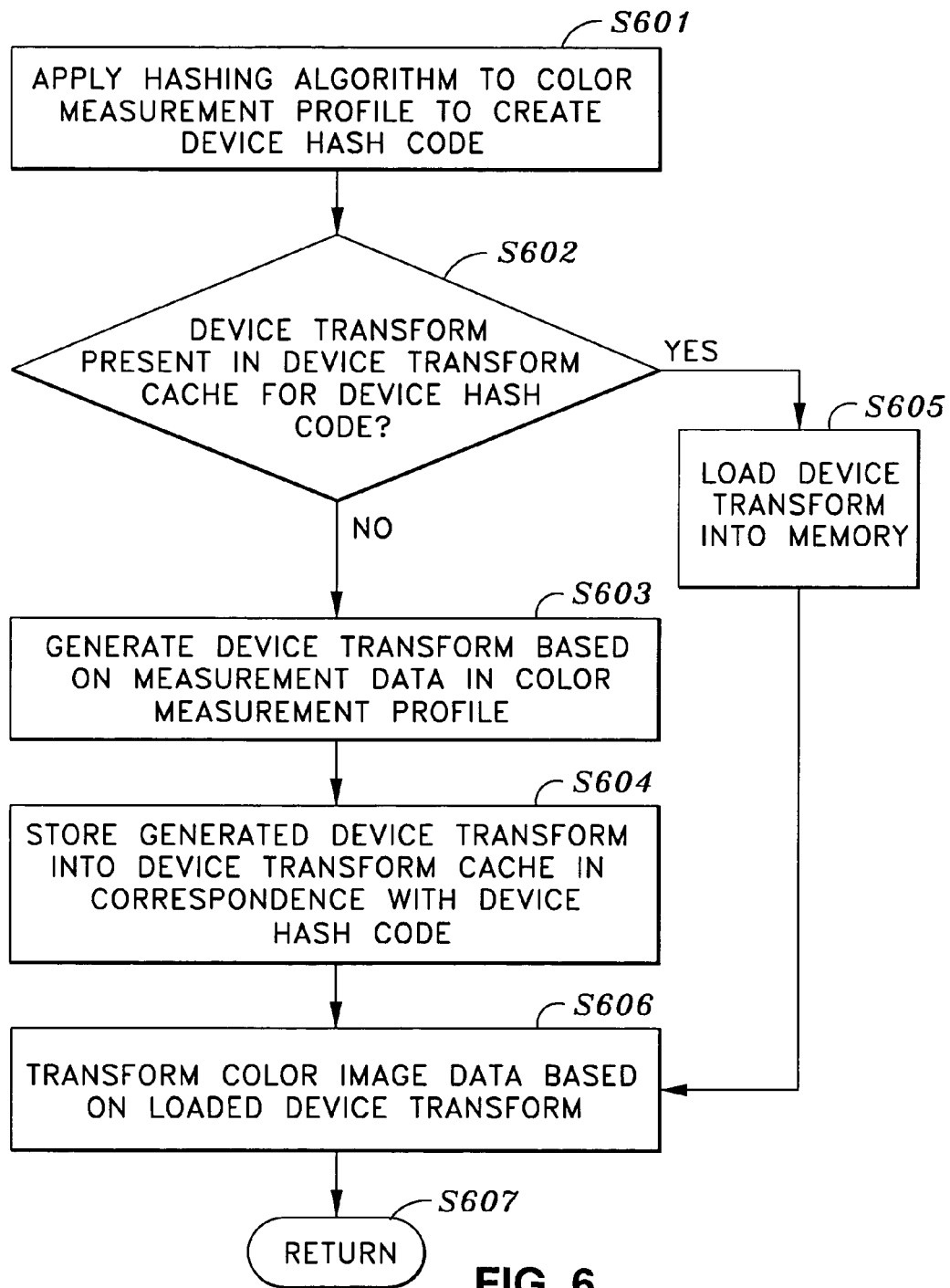
FIG. 6 is a flow chart for explaining color management with caching according to one embodiment of the invention.

The FIG. 6 is a flowchart for describing the color management scheme with device transform caching according to a first embodiment of the invention which uses source and destination color measurement profiles as described above. In step S601, a selected one of hashing algorithm modules is applied to a predetermined set of data fields of one of the color measurement profiles involved in a color mapping in order to generate a unique device hash code for that color measurement profile. Next, in step S602, it is determined whether a device transform is present in device transform cache 140 that corresponds to the unique device hash code. If so, there is no need to re-generate the device transform from measurement data in the color measurement profile, and so the process flow proceeds to step S605, in which the device transform corresponding to the unique device hash code is loaded into program-accessible transient memory RAM 116 for use by color management module 145 in mapping color image data, and then process flow passes to step S606. If there is not a device transform present in device transform cache 140 that corresponds to the unique device hash code, then a device transform is generated based on the measurement data in the color measurement profile, such as color characteristics measurement data 163 (step S603). The generated device transform is then stored in device transform cache 140 in correspondence with the unique device hash code, so that it can be readily retrieved for future use by color management module 145 when necessary (step S604). Process flow then proceeds to step S606.

The color image data is then transformed by color management module 145 based on the device transform loaded into RAM 116 in step S606. Of course, it can be appreciated that color management module 145 can use other device transforms and/or gamut mapping steps when mapping the color image data for rendering by an output device, such as the device transform corresponding to another color measurement profile involved in the desired color mapping. According to the above described features of the invention, a color management scheme is provided which uses measurement data for color device transforms in order to achieve appropriate color mapping, while conserving computational resources by avoiding redundant generation of device transforms for the same color measurement profile.

Another embodiment of the invention is used to even further conserve computational resources in subsequent color mappings. In particular, a second embodiment of the invention involves a two-tiered caching technique which includes the device transform caching of the first embodiment described above, and which also includes transformation sequence caching in which entire transformation sequences are also cached for future use by color management module 145. This embodiment saves substantial additional computational resources in scenarios where a color mapping between the same set of color devices is performed on a repeated basis. For example, referring to FIG. 1, a user of computing resources 40 may frequently send images captured by camera 60 to printer 50 to be printed on photographic paper. In this case, the same color measurement profiles for camera 60 and printer 50 are going to be accessed repeatedly by color management module 145 for color mapping of color image data from the color space and gamut of camera 60 to the color space and gamut of printer 50. The same transformation sequence comprised of device transforms and at least one gamut mapping step will therefore be needed on a frequent basis. By caching the entire transformation sequence the first time it is generated, it only needs to be retrieved when subsequently required, thereby saving a significant amount of computing resources by color management module 145.

Figure 7:
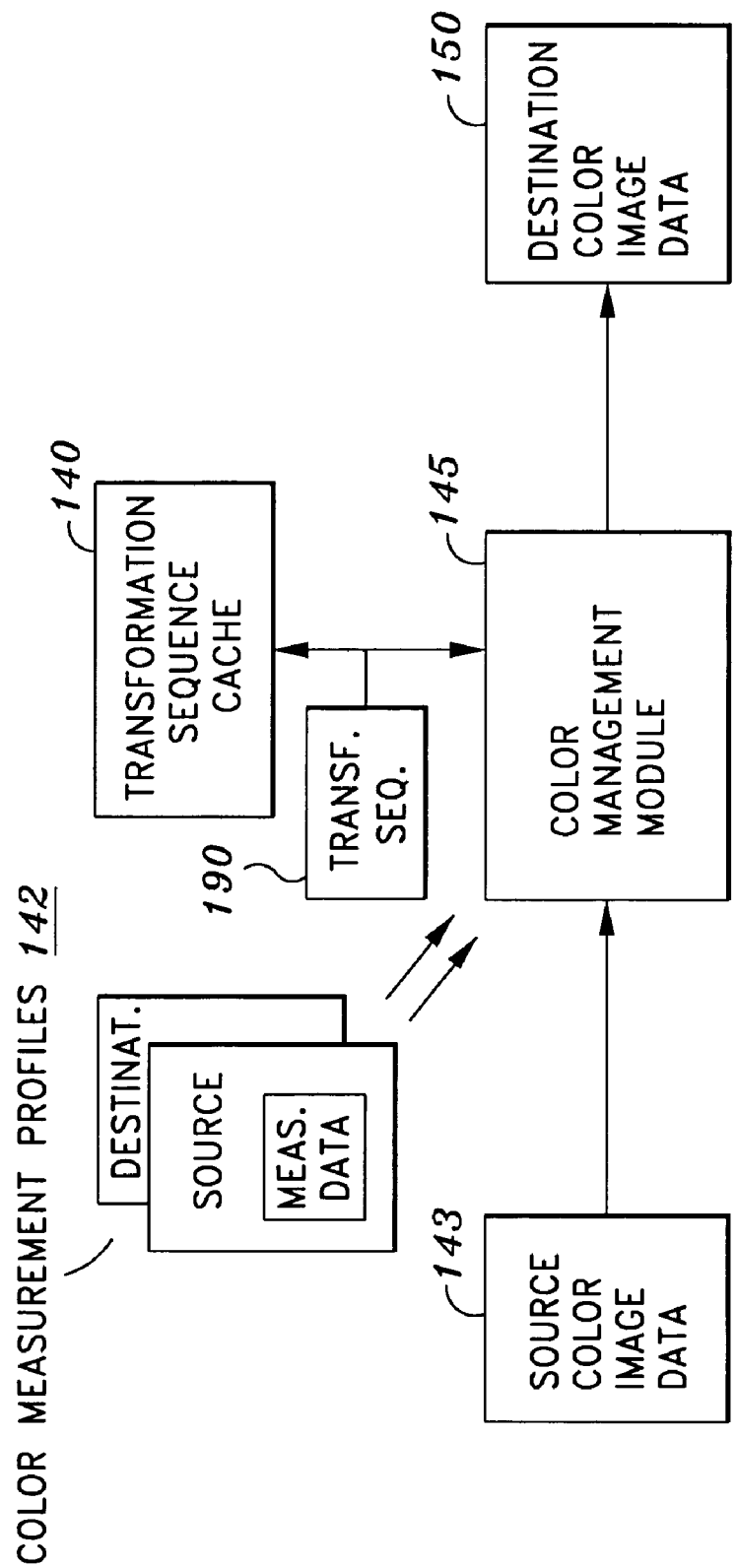
FIG. 7 is a diagram which depicts a color management process using a caching technique according to a second embodiment of the invention.

FIG. 7 depicts a color management scheme according to the second embodiment of the invention in which entire both device transforms and entire transformation sequences are cached in order to save computational resources from wasteful and redundant process steps every time color image data is mapped between the same set of devices, or when one of the same devices is involved in the color mapping. As seen in FIG. 7, color management module 145 renders color image data 143 from a source color space and gamut into destination color image data 150 which is in a destination color space and gamut. In this manner, color image data from a source device, such as camera 60 can be appropriately rendered by printer 50 on an output medium. Color management module 145 depicted in FIG. 7 uses measurement data from color measurement profiles 142 to generate the device transforms and gamut mapping steps necessary to transform color image data 143 into the color space and gamut of destination color image data 150. The measurement data reflects measured color characteristics that correspond to the color measurement profile.

This scheme allows a user or developer to develop, modify or control color management module 145 in order to achieve a desired rendering intent. In addition to caching each generated device transform 153 in device transform cache 140 when it is initially generated, as depicted in FIG. 3, color management module 145 also caches each transformation sequence 190 in transformation sequence cache 141 when each transformation sequence 190 is initially generated. In addition to the device transform retrieval as depicted in FIG. 3, whenever color mapping is performed by color management module 145, transformation sequence cache 141 is checked to see if the same required transformation sequence has already been generated and cached. If so, the transformation sequence is retrieved and used by color management module 145 to map color image data 143 into destination color image data 150. In this manner, the color management scheme of this embodiment of the invention uses two-tiered caching of both device transforms and transformation sequences in persistent memory to reduce the computational overhead required during color management of image data. If a previously-generated transformation sequence is subsequently needed, then it is retrieved from the second-tier cache and substantial computational resources are conserved by not having to regenerate the transformation sequence. Even if the needed transformation sequence is not found in the second-tier cache, substantial computational resources can still be conserved if one or more of the needed device transforms are found in the first-tier cache.

Figure 8:
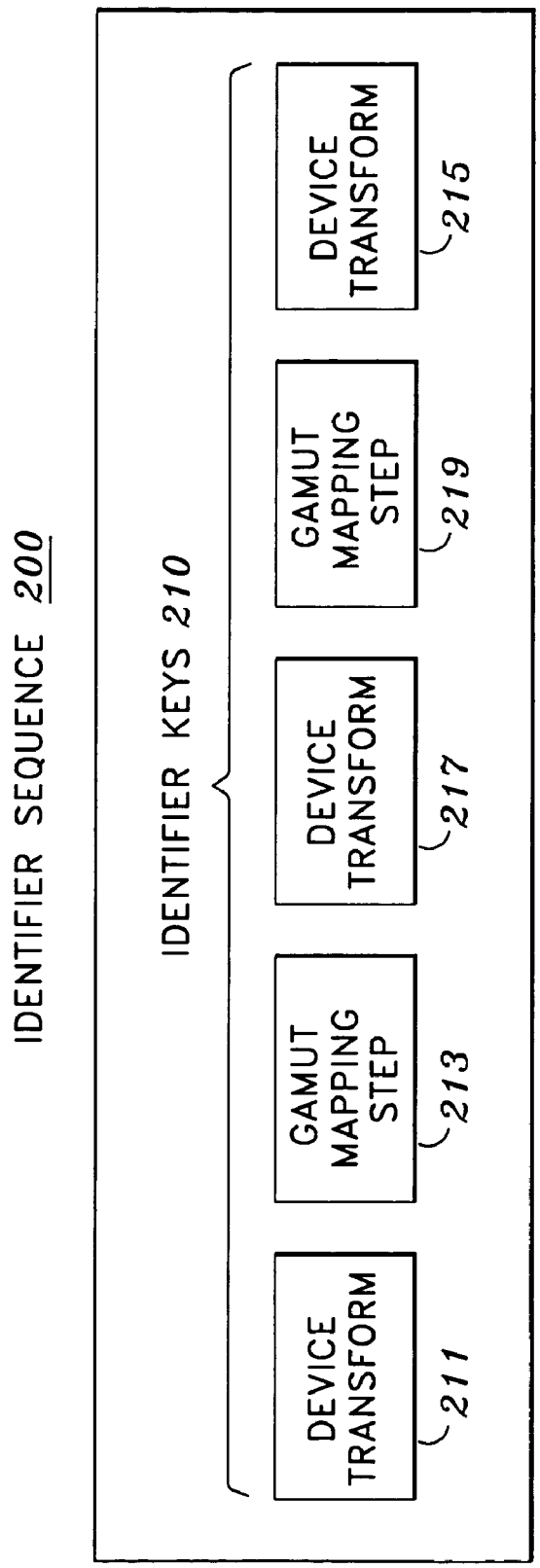
FIG. 8 is a diagram which depicts an identifier sequence according to a second embodiment of the invention.

Similar to the first embodiment, each cached transformation sequence is stored in correspondence to a unique identifier so that it can be readily retrieved by color management module 145. However, in this embodiment, each cached transformation sequences is not stored in correspondence with a hash code, but is instead stored in correspondence with an identifier sequence which describes the unique combination of device transforms and gamut mapping steps of the transformation sequence. FIG. 8 depicts such an identifier sequence which corresponds to a particular transformation sequence. As seen in FIG. 8, identifier sequence 200 is shown, which is comprised of a plurality of identifier keys 210. Each of identifier keys 210 in identifier sequence 200 uniquely identifies either a device transform or a gamut mapping step which is to be performed in the transformation sequence corresponding to identifier sequence 200.

In addition, identifier keys 210 are arranged in the order that their corresponding combination of device transforms and gamut mapping steps are to be performed. Those of identifier keys 210 which represent each of gamut mapping steps 213 and 217 are preferably comprised of a character string which represents the particular one of gamut mapping algorithms 144 to be used for that particular gamut mapping step. Those of identifier keys 210 which represent each of device transforms 211, 215 and 219 are preferably comprised of a device hash code which is generated by application of one of hashing algorithm modules 139 to the corresponding color measurement profile, as described above with respect to the first embodiment of the invention. Identifier sequence 200 is generated by color management module 145 when color mapping is requested using a certain combination of color measurement profiles. Color management module 145 determines the needed device transforms and gamut mapping steps for the transformation sequence, and their respective order in the transformation sequence, based on the combination of color measurement profiles. In this way, color management module 145 automatically identifies the required transformation sequence for every color mapping it performs.

Figure 9:
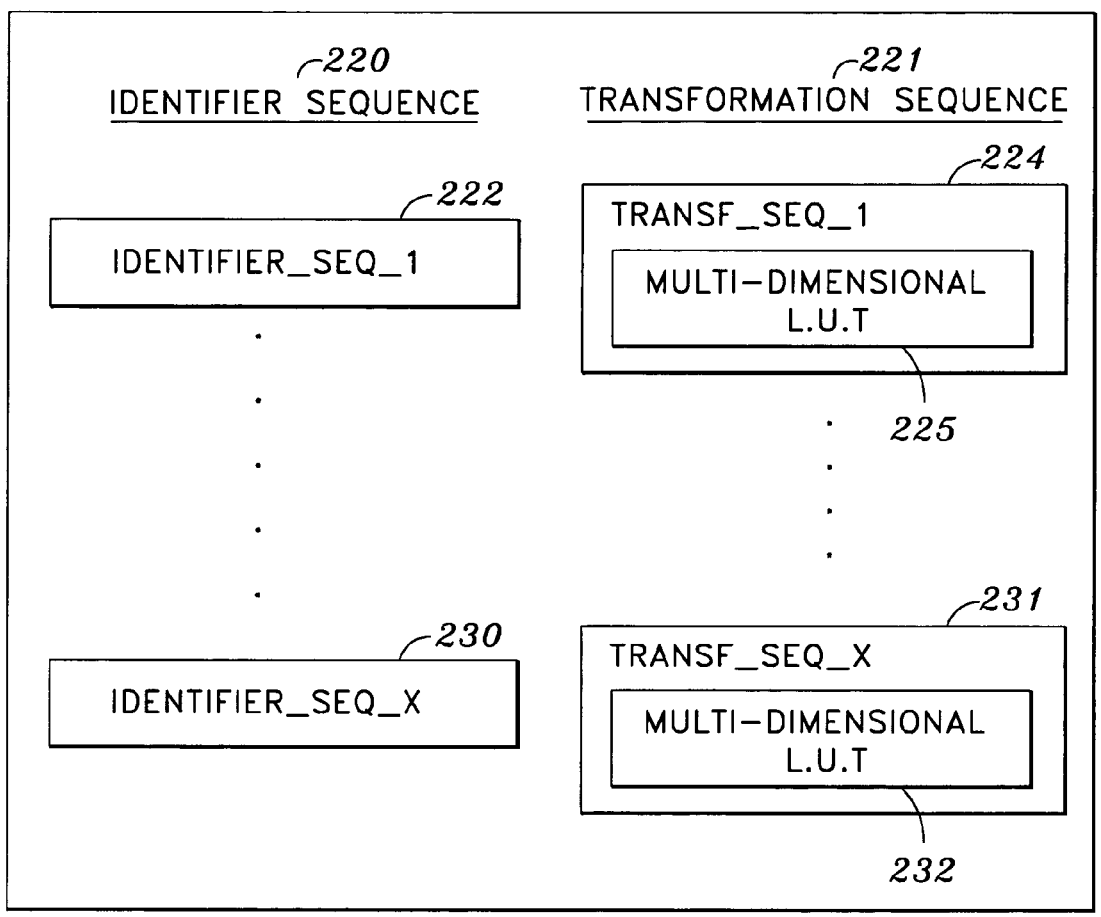
FIG. 9 is a diagram which depicts a transformation sequence cache according to a second embodiment of the invention.

FIG. 9 depicts the structure of transformation sequence cache 141 which implements functionality of the invention. Preferably, transformation sequence cache 141 is in the form of a database for ease of access and management, although other storage formats can be used without departing from the functionality and spirit of the invention. As seen in FIG. 9, transformation sequence cache 141 is arranged in two columns of data fields, including "identifier sequence" column 220 and "transformation sequence" column 221. Each row of transformation sequence cache 141 includes a specific identifier sequence under "identifier sequence" column 220 and a corresponding transformation sequence under "transformation sequence" column 221. As mentioned above, color management module 145 stores each generated transformation sequence in transformation sequence cache 141 for future use to avoid repetitive and wasteful computations. Accordingly, each cached transformation sequence is stored in correspondence to a unique identifier sequence so that color management module 145 can conveniently find a transformation sequence corresponding to a particular combination of color devices involved in the mapping of color image data. For example, identifier_sequence_1 222 is in the row corresponding to transformation_sequence_1 224 in transformation sequence cache 141, and identifier_sequence_x 230 is in the row corresponding to transformation_sequence_x 231.

In this regard, each identifier sequence under "identifier sequence" column 220 is generated as described above with respect to FIG. 8. In a subsequent color mapping, color management module 145 first generates the required identifier sequence based on the provided combination of color measurement profiles, and then searches transformation sequence cache 141 to determine if the same identifier sequence is present under "identifier sequence" column 220. If so, the transformation sequence under "transformation sequence" column 221 which corresponds to the same identifier sequence is retrieved for use by color management module 145.

As also seen in FIG. 9, each cached transformation sequence, such as transformation_sequence_1 224, contains at least one multi-dimensional look-up table (L.U.T.) 225, and can include other data structures as well for representing a transformation sequence between the color space and gamut of the source and destination color devices corresponding to the given combination of color measurement profiles. Multi-dimensional look-up table (L.U.T.) 225 is initially generated by color management module 145 based on the device transforms and gamut mapping steps corresponding to identifier keys 210 of identifier sequence 200 which is first generated by color management module 145. The needed device transforms for a given transformation sequence are obtained in the manner described above with respect to the first embodiment of the invention. The gamut mapping steps are generated by applying the one of gamut mapping algorithms 144 which corresponds to the identifier key in identifier sequence 200 to gamut descriptor measurement data 165 of each of the source and destination color measurement profiles. Multi-dimensional look-up table (L.U.T.) 225 of the transformation sequence is then used by color management module 145 to map color image data when the same combination of device transforms and gamut mapping steps are required. Other known formats and structures may also be used for each cached transformation sequence in transformation sequence cache 141 without departing from the functionality and spirit of the invention.

Figure 10:
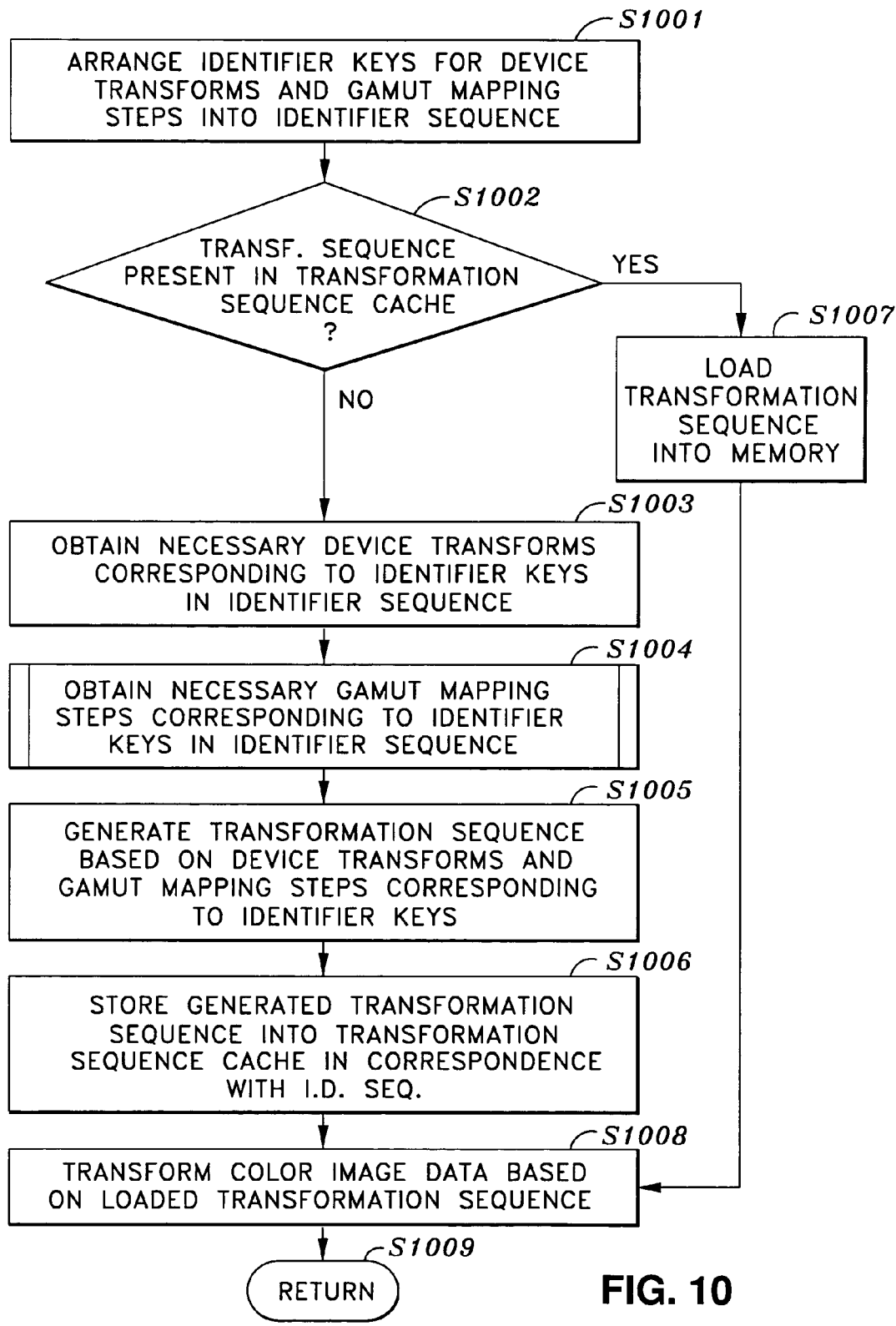
FIG. 10 is a flow chart for explaining color management with tiered caching according to a second embodiment of the invention.

FIG. 10 is a flowchart for depicting a color management scheme with two-tiered caching of both device transforms and transformation sequences according to the second embodiment of the invention. In step S1001, identifier keys for the needed device transforms and gamut mapping steps are arranged in the needed order into a generated identifier sequence based on a given combination of color measurement profiles. In step S11002, it is determined if a transformation sequence is present in transformation sequence cache 141 which corresponds to the generated identifier sequence. If so, there is no need to re-generate the needed transformation sequence, and so process flow passes to step S1007, in which the transformation sequence is loaded into memory for use by color management module 145, and then process flow proceeds to step S1008. If, however, a transformation sequence is not present in transformation sequence cache 141 which corresponds to the generated identifier sequence, then process flow proceeds to step S1003 in which the necessary device transforms are obtained based on their respective device hash codes contained in the corresponding identifier keys of identifier sequence 200. In this regard, each device transform is either generated for the first time or retrieved from device transform cache 140, in the manner described above with respect to FIG. 6, which is not repeated here for the sake of brevity. This caching of device transforms is the first tier of caching of the caching scheme of the second embodiment of the invention.

Next, in step S1004, the necessary device gamut mapping steps are obtained based on their respective gamut mapping algorithm identifiers in the corresponding identifier keys of identifier sequence 200. As discussed above, the gamut mapping step is generated by applying the identified gamut mapping algorithm to the gamut descriptor measurement data of the color measurement profiles for the source and destination color devices. This step is described in more detail below with respect to FIG. 11. A transformation sequence is then generated by color management module 145 based on the obtained device transforms and gamut mapping steps which correspond to identifier keys 210 of identifier sequence 200 (step S1005). The transformation sequence preferably comprises at least one multi-dimensional look-up table.

The generated transformation sequence is then stored in step S1006 into transformation sequence cache 141 in correspondence with identifier sequence 200, so that it can be readily retrieved by color management module 145 for subsequent color mappings. Next, the color image data is then mapped to destination color image data in step S11008 based on the transformation sequence that was loaded into memory. Process flow then proceeds to "return" in step S1009.

Figure 11:
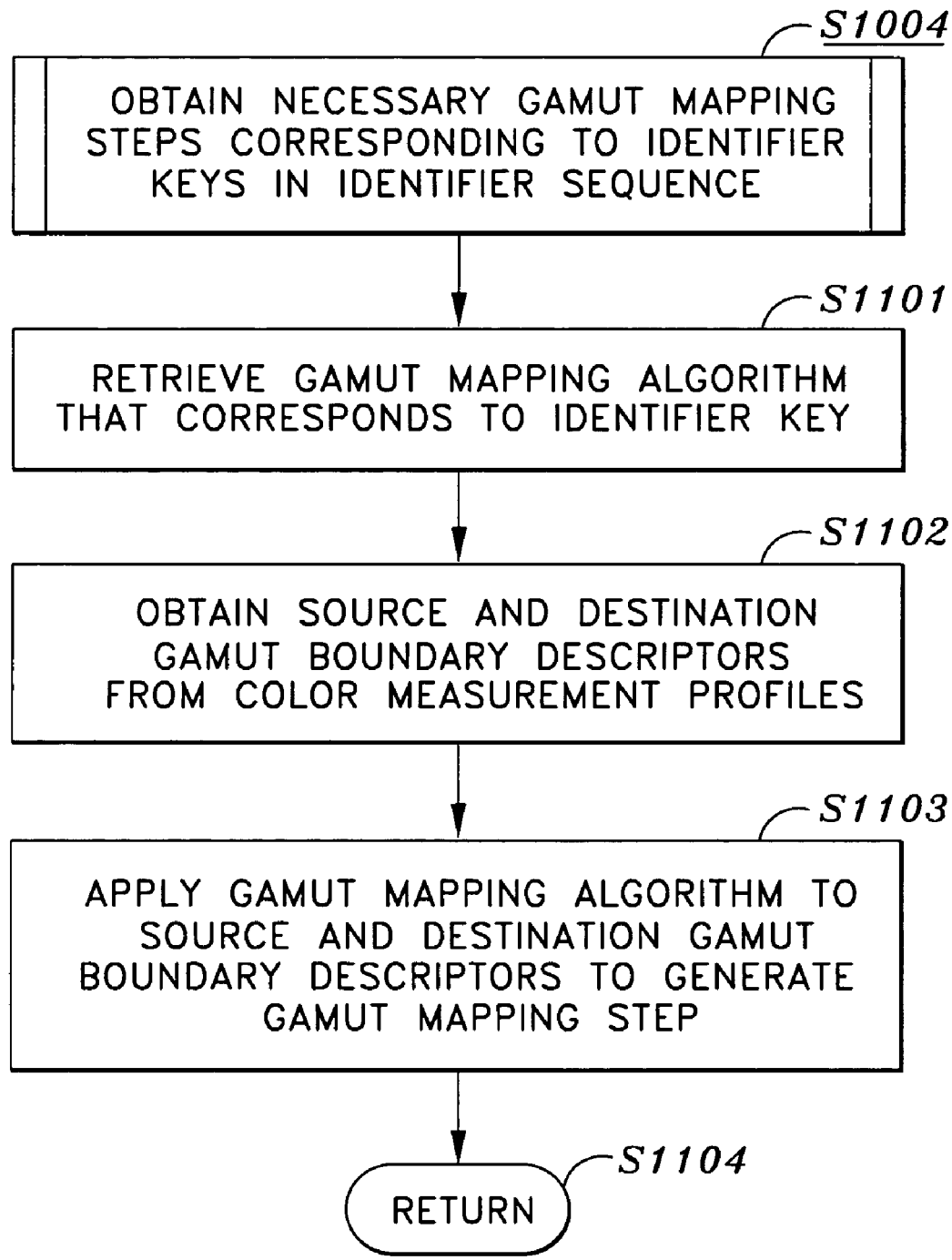
FIG. 11 is a flow chart for explaining the obtainment of gamut mapping steps in the color management process depicted in FIG. 10 according to a second embodiment of the invention.

FIG. 11 is a flow chart which explains in greater detail step S1004 of FIG. 10 in which each necessary gamut mapping step is obtained. In step S1101 of FIG. 11, the gamut mapping algorithm identified by the corresponding identifier key of identifier sequence 200 is retrieved from gamut mapping algorithms 144. Next, gamut descriptor measurement data 165 from each of the color measurement profiles for the source and destination devices is obtained (step S1102). In step S1103, the gamut mapping step is then generated by applying the identified gamut mapping algorithm to the gamut descriptor measurement data of the color measurement profiles for the source and destination color devices. Process flow then proceeds to "return" in step S1104.

According to the foregoing features, the invention provides a color management scheme with two-tiered caching to avoid redundant computations associated with re-generating previously-generated device transforms and/or transformation sequences every time color mapping is performed.

Although the foregoing color management scheme of the invention was described as being performed by color management module 145, it should be appreciated that other programs, modules or devices can implement the functionality of the present invention without departing from the nature and spirit of the invention. In addition, the invention can be implemented in a computing device, and can be implemented in computer-executable process steps stored in a computing device or on a computer-readable medium.

Although the invention has been described with particular illustrative embodiments, the invention is not limited to the above-described embodiments and various changes and modification may be made by those of ordinary skill in the art without departing from the spirit and scope of the invention.

What is claimed is:

1. A method for performing color management of color image data using a device transform, the method comprising the steps of:
   generating an identifier key based on contents of a color measurement profile for a color device, the color measurement profile containing measurement data corresponding to the color device;
   determining if a device transform corresponding to the identifier key is present in a device transform cache disposed in a persistent memory;
   loading, in the case that it is determined that a device transform corresponding to the identifier key is present in the device transform cache, the device transform into a program-accessible transient memory;
   generating, in the case that it is determined that a device transform corresponding to the identifier key is not present in the device transform cache, a device transform based on the measurement data in the color measurement profile, and storing the generated device transform in the device transform cache in correspondence with the identifier key; and
   transforming the color image data based on the device transform loaded in the program-accessible transient memory.

2. A method according to claim 1, wherein the identifier key is a device hash code which is generated by applying a hashing algorithm to the color measurement profile.

3. A method according to claim 1, wherein the measurement data in the color measurement profile is obtained by using a color target containing colors produced by the color device.

4. A method according to claim 3, wherein the color target is generated in accordance with a predetermined standard.

5. A method according to claim 1, wherein the color device is selected from a group including a color printer, a display, a scanner and a camera.

6. A method according to claim 2, wherein the color measurement profile contains a plurality of data fields, at least one of the plurality of data fields containing the measurement data, and wherein the hashing algorithm performs a hash of at least one of the plurality of the data fields to create the device hash code.

7. A method according to claim 2, wherein the hashing algorithm is a predetermined standardized hashing algorithm.

8. A method according to claim 2, wherein the hashing algorithm is selected from one of a plurality of predetermined hashing algorithms.

9. A method according to claim 1, wherein the persistent memory is a hard disk.

10. A method according to claim 1, wherein the program-accessible transient memory is a random access memory which is directly accessible by a central processing unit.

11. A method according to claim 1, wherein the device transform cache is a database of device transforms, each device transform being indexed in accordance with an identifier key corresponding to the color measurement profile used to generated the device transform.

12. A method according to claim 1, wherein the device transform includes at least one look-up table which is based on the measurement data in the color measurement profile.

13. A method according to claim 12, wherein, in the transforming step, the look-up table is accessed and used to map the color image data between a device color space corresponding to the color device and a color appearance space.

14. A computing device for performing color management of color image data, comprising:
   a program memory for storing process steps executable to perform a method according to any of claims 1 to 13; and
   a processor for executing the process steps stored in said program memory.

15. Computer-executable process steps stored on a computer readable medium, said computer-executable process steps for performing color management of color image data, said computer-executable process steps comprising process steps executable to perform a method according to any of claims 1 to 13.

16. A computer-readable medium which stores computer-executable process steps, the computer-executable process steps for performing color management of color image data, said computer-executable process steps comprising process steps executable to perform a method according to any of claims 1 to 13.

17. An apparatus for performing color management of color image data using a device transform, comprising:
   identifier generating means for generating an identifier key based on contents of a color measurement profile for a color device, the color measurement profile containing measurement data corresponding to the color device;
   determining means for determining if a device transform corresponding to the identifier key is present in a device transform cache disposed in a persistent memory;

loading means for loading, in the case that it is determined that a device transform corresponding to the identifier key is present in the device transform cache, the device transform into a program-accessible transient memory;

device transform generating means for generating, in the case that it is determined that a device transform corresponding to the identifier key is not present in the device transform cache, a device transform based on the measurement data in the color measurement profile, and storing the generated device transform in the device transform cache in corresponding with the identifier key; and transforming means for transforming the color image data based on the device transform loaded in the program-accessible transient memory.

* * * * *

UNITED STATES PATENT AND TRADEMARK OFFICE
CERTIFICATE OF CORRECTION

| | |
|---|---|
| PATENT NO. | : 7,129,958 B2 |
| APPLICATION NO. | : 10/650548 |
| DATED | : October 31, 2006 |
| INVENTOR(S) | : Todd D. Newman et al. |

It is certified that error appears in the above-identified patent and that said Letters Patent is hereby corrected as shown below:

COLUMN 3
      Line 35, "to generated" should read --to generate--.

COLUMN 6
      Line 30, "such" should be deleted; and
      Line 33, "need" should read --needed--.

COLUMN 8
      Line 17, "created" should read --create--;
      Line 42, "thee" should read --the--; and
      Line 47, "may be" should read --may--.

COLUMN 9
      Line 61, "entire both" should read --both entire--.

COLUMN 10
      Line 46, "sequences" should read --sequence--.

COLUMN 12
      Line 60, "step S11008" should read --step S1008--.

COLUMN 16
      Line 2, "in corresponding" should read --in correspondence--.

Signed and Sealed this

Twelfth Day of June, 2007

JON W. DUDAS
*Director of the United States Patent and Trademark Office*